Dec. 19, 1944. E. O. ROEDER 2,365,594
MICROSCOPE
Filed Jan. 26, 1942
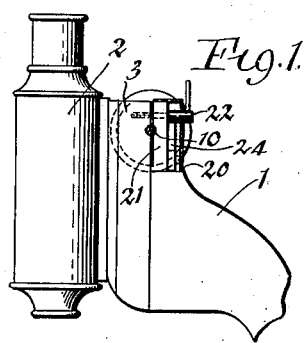
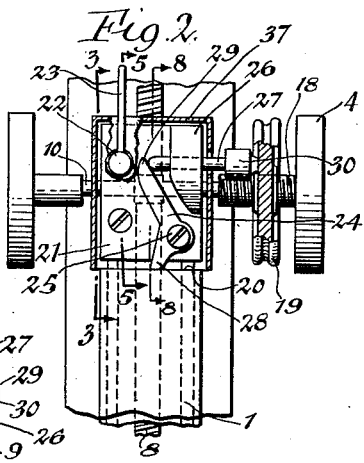
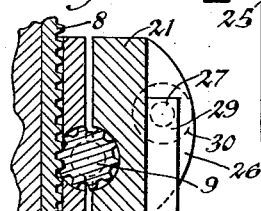
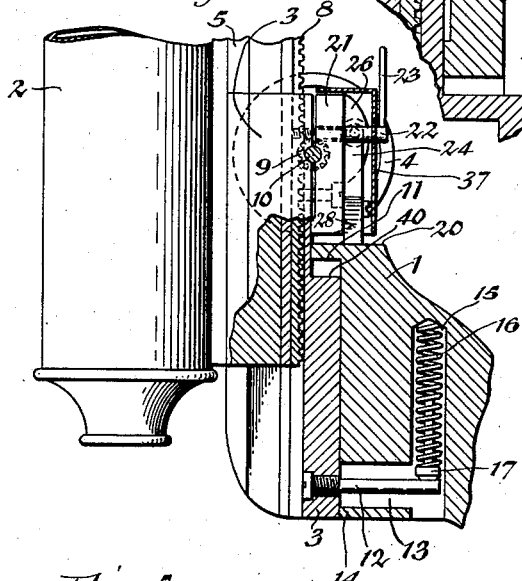
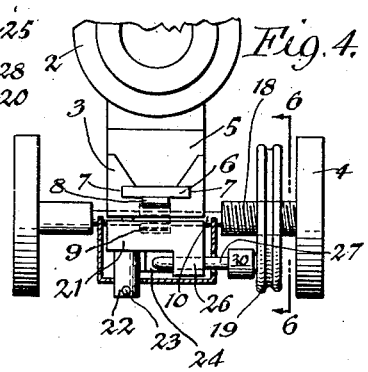
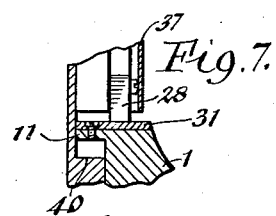
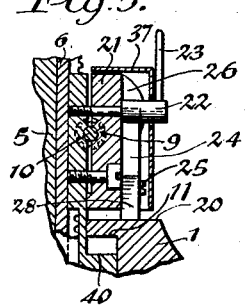
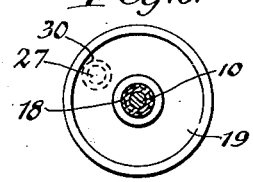
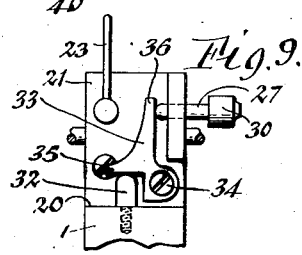
INVENTOR.
ERWIN O. ROEDER
ATTORNEY Patented Dec. 19, 1944

2,365,594

UNITED STATES PATENT OFFICE 2,365,594

MICROSCOPE

Erwin O. Roeder, Ebenezer, N. Y., assignor to Spencer Lens Company, Buffalo, N. Y., a corporation of New York Application January 26, 1942, Serial No. 428,215

8 Claims. (Cl. 88—39)

This invention relates to microscopes and more particularly to a new and improved adjustment mechanism in which the coarse and fine adjustments are on the same level.

An object of the invention is to provide new and improved adjustment mechanisms for microscopes wherein the coarse and fine adjusting means are on the same level.

Another object of the invention is to provide new and improved adjusting mechanism for microscopes wherein the coarse and fine adjusting means are on the same axis and means whereby the coarse adjusting mechanism may be locked to prevent its displacement while employing the fine adjusting device.

Another object of the invention is to provide an adjusting mechanism for microscopes wherein the coarse and fine adjusting arrangements are on the same axis and wherein the number of parts in the fine adjusting mechanism has been reduced to a minimum.

Another object of the invention is to provide adjustment mechanism for microscopes wherein the coarse and fine adjustment devices are on the same axis and wherein the coarse and fine adjustment knobs are concentric.

Other objects and advantages of the invention will be apparent from the following discussion taken in connection with the accompanying drawing and it will be understood that many changes may be made in the details of construction and arrangement of parts without departing from the spirit of the invention as expressed in the accompanying claims. I, therefore, do not wish to be limited to the exact details of construction and arrangement of parts shown and described as the preferred form has been shown by way of illustration only.

Referring to the drawing:

Fig. 1 is a fragmentary side elevation view of the supporting arm and the body tube of a microscope embodying the invention.

Fig. 2 is an end view on an enlarged scale with part of the cover removed to show the fine adjustment mechanism.

Fig. 3 is a sectional view taken on line 3—3 of Fig. 2 looking in the direction of the arrows.

Fig. 4 is a top plan view, on an enlarged scale, of the arrangement shown in Fig. 1.

Fig. 5 is a sectional view taken on line 5—5 of Fig. 2 looking in the direction of the arrows.

Fig. 6 is a fragmentary sectional view taken on line 6—6 of Fig. 4 looking in the direction of the arrows.

Fig. 7 is a fragmentary sectional view similar to Fig. 5 but showing a modified form of the invention.

Fig. 8 is a sectional view on an enlarged scale taken on line 8—8 of Fig. 2 looking in the direction of the arrows, and Fig. 9 is a view generally similar to Fig. 2 but showing a modified form of the invention.

Referring more particularly to the drawing wherein similar reference characters designate corresponding parts throughout the several views, there is shown the supporting arm 1, the body tube 2 and the tube slide 3. In the construction shown, which is the usual type, the body tube 2, is adjustable vertically on the tube slide 3 and is adapted to be adjusted thereon by the coarse adjusting mechanism which is operated by the knob 4, while the slide 3 is adjustable vertically on the supporting arm 1 and is adapted to be adjusted thereon by the fine adjustment mechanism.

The body tube 2 is provided with a beveled portion 5 to slide in a guide way in the front side of the slide 3 and adapted to be retained in said guide way in the front of said slide 3 by the bar 6 secured on the rear face of the body tube slide portion with its edges extending into vertical grooves 7 in the slide member.

On the rear surface of the bar 6 is secured the rack member 8, which is engaged by the pinion 9 on the shaft 10 and therefore, on movement of the knob 4, the body tube 2 is raised or lowered, depending on the direction of rotation of said knob 4, by means of said rack 8 and pinion 9.

The slide member 3 fits into a dovetail slide in the front edge of the supporting arm 1 and has a shoulder 40 adapted to engage the forwardly extending shoulder 11 on the supporting arm 1 and adapted to engage said shoulder 40 to limit the upward movement of said slide 3 and the slide 3 is also provided adjacent its lower end with the pin member 12 secured to said slide member 3 and extending into the opening 13 adjacent the lower forward edge of the supporting arm 1 and which pin 12 engages the lower portion 14 of said supporting arm 1 to limit the downward movement of said slide 3.

In the vertical opening 15 in said supporting arm 1 is positioned a coil spring 16 which bears against the upper end of the opening, at its upper end, and at its lower end bears against the plunger 17, which plunger engages the end of said projecting member 12. Due to the action of the spring 16 the said slide member 3 is always held at the lowest point of its adjusted position against the action of the fine adjusting mechanism.

The shaft 10 is provided with the threaded portion 18 and on this threaded portion 18 is the knob 19 having an internal threaded bore adapted to threadedly engage the said threaded portion 18 of the shaft 10. The forward end of the supporting arm 1 has the flat upper surface 20, adapted to engage the fine adjusting mechanism.

On the end of the slide 3 is provided the locking member 21 and the screw 22, having the handle 23.

By turning the handle 23 the screw 22 is tightened against the locking member 21 which engages the shaft 10 to lock the body tube 2 in the position to which it has been adjusted by means of the coarse adjusting mechanism through the rack 8 and the pinion 9.

Adjacent the lower end of said locking member 21 is pivoted the fine adjustment member 24 on the pivot member 25 and adjacent the upper side portion of said locking member 21 is provided the block 26 having an opening therethrough, through which is placed the fine adjustment actuating member 27.

The fine adjustment member 24 has the portion 28 which is adapted to engage the upper flat surface 20 and the upper extending portion 29 adapted to engage the end of the fine adjustment actuating member 27.

The member 27 has the rider portion 30 adjacent the end thereof and adapted to engage the side of said fine adjusting knob 19, as shown in dotted line in Fig. 6. This portion 30 can be integral with said member 27 or may be a fibre wheel or roller or point secured adjacent the end of said member 27 to reduce friction.

It will be seen that by turning the fine adjustment knob 19, that the threaded connection between the threaded portion 18 on the shaft 10 and the threaded internal bore of the knob 19 will cause said knob 19 to move on said threaded portion 18 and as knob 19 bears against the rider portion 30 of said actuating member 27, said actuating member 27 will move correspondingly and will cause said member 24 also to move. When said knob 19 is moved away from said member 27 the member 27 will likewise move and as said movement is against the action of the coil spring 16, the tube 3 will be caused to assume a lower position by said movement of the member 27 and when said knob 19 is turned so as to move away from the knob 4 the actuating member 27 will accordingly turn the pivot member 24 and the portion 28 of said pivot member 24 engaging the upper surface 20 will force the body tube to move upwardly in a vertical direction against the action of said spring 16.

In the form of the invention shown in Fig. 7 the flat upper surface 20 of the forwardly extending end of supporting arm 1 has been provided with the hardened plate or bearing surface 31.

In the form of the invention shown in Fig. 9 the construction is substantially the same as described above except on the upper surface 20 of the forwardly extending end of the supporting arm 1 is provided the pin 32. The member 33 is pivotally mounted on said locking member 21 on the pivot 34. The member 33 has the portion 35 adapted to engage the upper surface of pin 32 and the portion 36 adapted to engage the actuating member 27 so that movement of the actuating member 27 will cause pivotal movement of the portions 35 and 36 about their center or pivot 34 and move the slide 3 vertically either up or down, according to the direction of movement of the actuating member 27 as described above for the form shown in the prior figures.

The fine adjustment mechanism is preferably covered with a hood or dust shield 37 and if desired means may also be provided to prevent dust entering the exposed teeth of the threaded portion 18 on the shaft 10.

From the foregoing it will be seen that I have provided simple, efficient and economical means for obtaining an adjustment mechanism for microscopes wherein the coarse and fine adjustment devices are on the same level.

Having described my invention, I claim,

1. In a device of the character described, a support, a slide member adjustable on said support, a body tube adjustable on said slide member, rack and pinion means for adjusting said body tube, a shaft for rotating said pinion, said shaft having a threaded portion, a coarse adjusting knob on said shaft and a fine adjusting knob having a threaded portion in threaded engagement with the threaded portion of said shaft, a pivoted lever having a portion engaging said support, a member engaging said pivoted lever and also engaging said fine adjusting knob whereby movement of said fine adjustin knob will rotate said pivoted lever to raise or lower the said body tube.

2. In a device of the character described, a support, a slide member adjustable on said support, a body tube adjustable on said slide member, rack and pinion means for adjusting said body tube, a shaft for rotating said pinion, said shaft having a threaded portion, a coarse adjusting knob on said shaft and a fine adjusting knob having a threaded portion in threaded engagement with the threaded portion of said shaft, a pivoted lever having a portion engaging said support, a member engaging said pivoted lever and also engaging said fine adjusting knob whereby movement of said fine adjusting knob will rotate said pivoted lever to raise or lower the said body tube, and lock means whereby said coarse adjusting mechanism may be locked to prevent movement thereof during the use of the fine adjusting mechanism.

3. In a device of the character described, a support, an intermediate member adjustably mounted relative to said support, a body tube member adjustably mounted on said intermediate member, a pinion for actuating said body tube member, a shaft for rotating said pinion, a coarse adjusting knob and a fine adjusting knob on said shaft, a lever pivotally mounted on said intermediate member and engaging said support and means engaging said lever and said fine adjusting knob and actuated by rotation of said fine adjusting knob for pivoting said lever and thereby causing adjustment of said intermediate member relative to said support.

4. In a device of the character described, a support, a member adjustably mounted relative to said support, a pinion for actuating said adjustable member, a shaft for rotating said pinion, a coarse adjusting knob and a fine adjusting knob on said shaft, a lever pivotally mounted on said adjustable member and engaging said support and means extending between said lever and said fine adjusting knob and actuated by rotation of said fine adjusting knob for pivoting said lever and thereby causing adjustment of said adjustable member relative to said support.

5. In a device of the character described, a support member, a member adjustably mounted relative to said support, a pinion for actuating said adjustable member relative to said support member, a shaft for rotating said pinion, a coarse adjusting knob and a fine adjusting knob on said shaft, one of said members having a lever pivotally mounted thereon and having a portion engaging the other of said members, and means engaging said lever and said fine adjusting means and actuated by rotation of said fine adjusting knob for pivoting said lever and thereby causing adjustment of said adjustable member relative to said support.

6. In a device of the character described, a support member, a member adjustably mounted relative to said support, a pinion for actuating said adjustable member relative to said support member, a shaft for rotating said pinion, a coarse adjusting knob and a fine adjusting knob on said shaft, one of said members having a lever pivotally mounted thereon and having a portion engaging the other of said members, driving means on said shaft and means extending between said lever and said driving means and actuated by rotation of said fine adjusting knob for pivoting said lever and thereby causing adjustment of said adjustable member relative to said support, and means for locking said shaft against rotation during rotation of said fine adjusting knob.

7. In a device of the character described, a support member, a member adjustably mounted on said support, means for actuating said adjustable member relative to said support, a shaft for said actuating means, a coarse adjusting knob and a fine adjusting knob on said shaft, a lever pivotally mounted on one of said members and having a portion engaging the other of said members, driving means on said shaft and means having one end engaging said lever and its other end engaging said driving means and actuated by rotation of said fine adjusting knob for pivoting said lever and thereby causing adjustment of said adjustable member relative to said support.

8. In a device of the character described, a support member, a member adjustably mounted relative to said support, means for actuating said adjustable member relative to said support comprising a shaft for said actuating means, a coarse adjusting knob and a fine adjusting knob on said shaft, one of said members having a lever pivotally mounted thereon having a portion engaging the other of said members, said lever having an arm for use in pivoting said lever, and a slidable member having a portion adjacent one end engaging said fine adjusting knob and a portion adjacent its opposite end engaging said arm on said lever, said slidable member being actuated by rotation of said fine adjusting knob for actuating said lever and thereby causing adjustment of said adjustable member relative to said support.

ERWIN O. ROEDER.